W. RUSSELL.
SCREW CUTTING DIE.
APPLICATION FILED APR. 28, 1914.
1,130,542.
Patented Mar. 2, 1915.
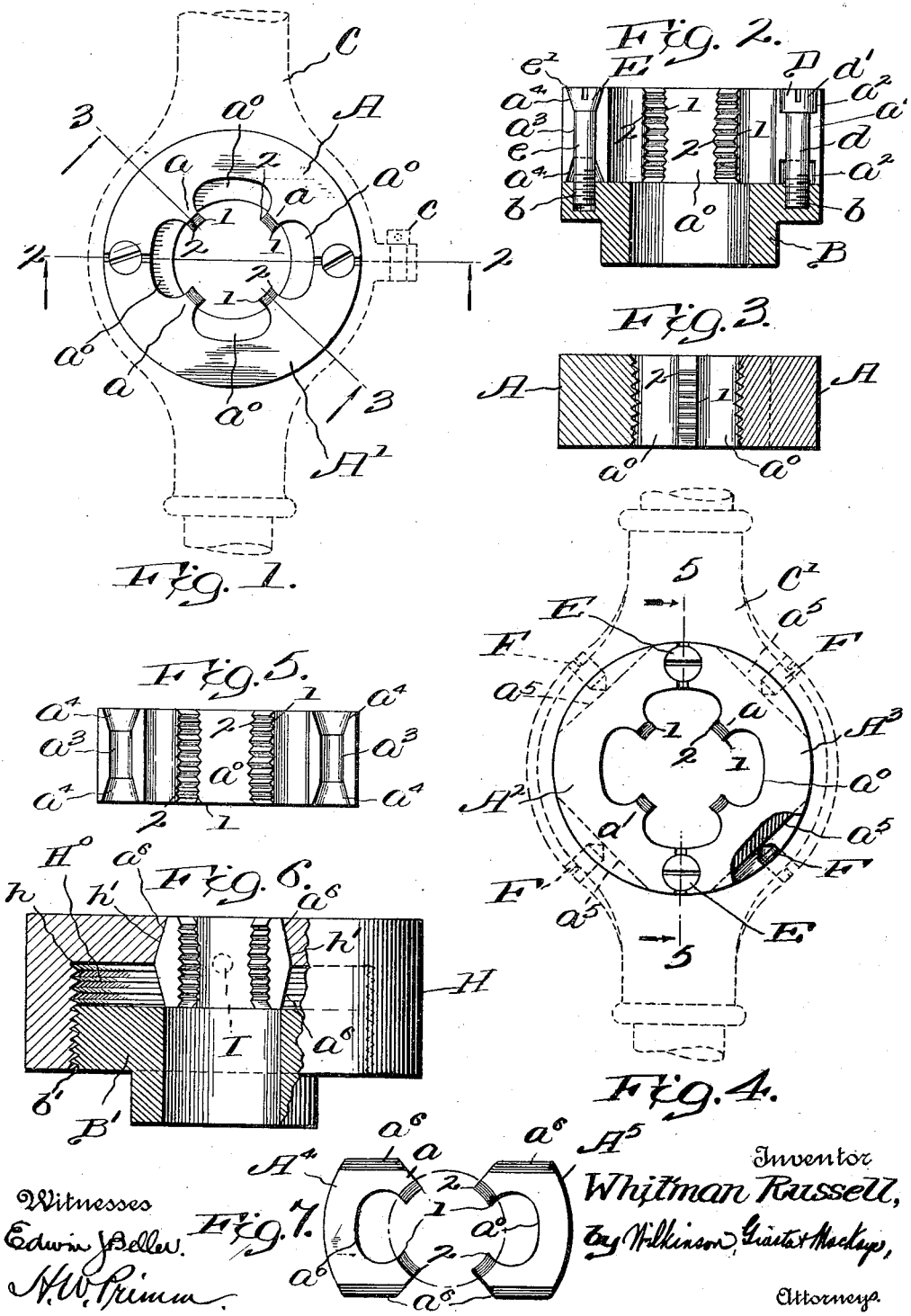

UNITED STATES PATENT OFFICE.

WHITMAN RUSSELL, OF GREENFIELD, MASSACHUSETTS, ASSIGNOR TO RUSSELL MANUFACTURING COMPANY, OF GREENFIELD, MASSACHUSETTS, A CORPORATION OF MASSACHUSETTS.

SCREW-CUTTING DIE.

1,130,542.　　　　Specification of Letters Patent.　　Patented Mar. 2, 1915.

Application filed April 28, 1914.　Serial No. 835,011.

*To all whom it may concern:*

Be it known that I, WHITMAN RUSSELL, a citizen of the United States, residing at Greenfield, in the county of Franklin and State of Massachusetts, have invented certain new and useful Improvements in Screw-Cutting Dies; and I do hereby declare the following to be a full, clear, and exact description of the invention, such as will enable others skilled in the art to which it appertains to make and use the same.

My present invention relates to improvements in screw cutting dies, and it is intended to provide a die the teeth of which will cut equally well from either side, and it is intended to provide a die composed of reversible members having teeth sharpened on both ends, with means for turning these members over on the holder so that after the cutting edges on one side are either broken or worn, an entirely fresh set of cutting edges may be put into operation.

In adapting my invention to practical use, I prefer to depart as little as possible from standard types of screw cutting dies, and means for assembling the same and holding the same in the operative position; and, therefore, it can be most conveniently explained as applied to the holding and adjusting devices of standard type, the invention being particularly pointed out in the claims.

Reference is had to the accompanying drawings, showing three different styles of screw cutting dies, each of which is sharpened to cut equally well from either side, and each arranged to be reversed in the respective holder; that is each may be taken out of its holder, turned upside down and replaced, so that when the dies become dull, or broken on one side the operator may reverse them by simply turning them over, thereby bringing into position an entirely new set of cutting edges that will be equal in their way to the first set, and the die will be practically as good as new.

Figure 1 shows one form of die assembled in its holder for hand operation, the holder being shown in dotted lines; Fig. 2 shows a section through the guide for the die and shows one member of the die and its hinge screw and adjusting screw in elevation; the section being along the line 2—2 of Fig. 1, and looking in the direction of the arrows; Fig. 3 shows a section through the die members along the line 3—3 of Fig. 1; Fig. 4 is a similar view to Fig. 1, showing another form of die holder and means of assembling and adjusting the die therein; Fig. 5 shows one of the die members detached as it would appear looking along the line 5—5 of Fig. 4; Fig. 6 shows a central vertical section, partly in elevation, of the die holder, one member of the die being shown in elevation; the holder being adapted for machine work; and Fig. 7 is a plan view of two of the die members as detached from the holder of Fig. 6.

Referring first to Figs. 1, 2 and 3, the two die members A and A' are supported on the guide B, and these members are clamped into a die stock or holder C by means of the clamping screw $c$. The two die members are hinged together by the hinge screw D, and the dies are adjusted by the adjusting screw E. Each die member is provided with the usual grooves $a^0$, between which project the lands $a$ provided with teeth having cutting edges at each end thereof, as at 1, 2, so that all of the edges 1 will cut when the die holder is rotated in the normal direction, and when the die member is turned over then the cutting edges 2 will be put in operation. In order to permit this reversal, or turning over, of the die member sockets $a^2$ are provided at each end of the channel $a'$, so that the shank $d$ of the hinge screw D may be inserted from either direction, and the head $d'$ of said screw may engage in one or the other of these sockets $a^2$, as shown in Fig. 2. This hinge screw engages the screw threads $b$ in the guide B. At the opposite side of the die member a channel $a^3$ is provided for the shank $e$ of the adjusting screw E, and at each end of this channel $a^3$ are two tapered adjusting sockets $a^4$ adapted to engage the tapered head $e'$ of the adjusting screw E; and thus this adjusting screw may be used to adjust the two members of the die, whether the die be in the position shown in Fig. 2, or in the reverse position. The die being assembled in the positions shown in Figs. 1 and 2, to reverse the members it will be sufficient simply to loosen the die stock or holder, slip out the guide bearing the dies; then to reverse the die members on the guide, turn same over and shift each member to the opposite side of the guide, and then return the members to the die stock and clamp same therein as before.

Referring to the form of device shown in Figs. 4 and 5, the dies are held in the stock by the screws E and F, the latter of which have tapered points which project into guide grooves $a^5$ in the outer walls of the die members. To reverse the die members, simply unscrew all the screws, take out the members, turn the same upside down and transpose them in the stock, and then restore the screws to the initial position. In this form of device, instead of a hinge screw as shown in Fig. 2 there are two adjusting screws E generally similar to that already described with reference to Fig. 2.

In the form of device shown in Figs. 6 and 7, there is a screw guide B', which is screw-threaded as at $b'$ to engage in the screw threads $h$ in the chamber $H^o$ of the collet H. The walls of the collet are tapered, as at $h'$, to engage one or the other of the double tapered surfaces $a^6$ of the die members $A^4$ and $A^5$. It will be seen that the die members may be reversed in the collet by unscrewing the screw guide B' and taking out and reversing the die members and putting them back in the collet in the position shown in Fig. 6.

In order to provide a slight adjustment for the die members one or more adjusting screws I, shown in Fig. 6, may be used if desired.

While I have shown this arrangement of dies as applied to three types of die holders, it will be obvious that similar reversible die members may be mounted in any other suitable form of holding device.

While I have shown each die member as provided with two sets of lands, these die members may be provided with any desired number of sets of lands; each land having teeth adapted to be used from either edge, as hereinbefore described.

Having thus described my invention what I claim and desire to secure by Letters Patent of the United States is:—

1. A screw cutting die comprising a plurality of oppositely-disposed reversible members, each member being provided with lands and cutting teeth thereon, said teeth having cutting edges at each end adapted to operate when said die is turned in either direction, and to cut from either face when die is in either original or reversed position, with means for holding said die in either original or reversed position, substantially as described.

2. A screw cutting die comprising two oppositely-disposed reversible members, each member being provided with lands and cutting teeth thereon, said teeth having cutting edges at each end adapted to operate when said die is turned in either direction, and to cut from either face when die is in either original or reversed position, with means for holding said die in either original or reversed position, and with means for adjusting said members, substantially as described.

3. A screw cutting die comprising a plurality of oppositely-disposed reversible members, each member being provided with lands and cutting teeth thereon, said teeth having cutting edges at each end adapted to operate when said die is turned in either direction, and to cut from either face when die is in either original or reversed position, with means for holding said die in either original or reversed position, with means for adjusting said members, substantially as described.

In testimony whereof, I affix my signature, in presence of two witnesses.

WHITMAN RUSSELL.

Witnesses:
ELLEN K. O'KEEFE,
JOHN C. LEE.

Copies of this patent may be obtained for five cents each, by addressing the "Commissioner of Patents, Washington, D. C."